US010487859B2

(12) United States Patent
Staggers

(10) Patent No.: US 10,487,859 B2
(45) Date of Patent: Nov. 26, 2019

(54) APPARATUS AND METHOD FOR HIGH ENERGY DENSITY LINEAR ACTUATION WITH INTEGRAL BRAKING

(71) Applicant: Raytheon Company, Waltham, MA (US)

(72) Inventor: David D. Staggers, Vail, AZ (US)

(73) Assignee: Raytheon Company, Waltham, MA (US)

(*) Notice: Subject to any disclaimer, the term of this patent is extended or adjusted under 35 U.S.C. 154(b) by 169 days.

(21) Appl. No.: 15/689,265

(22) Filed: Aug. 29, 2017

(65) Prior Publication Data

US 2017/0356473 A1 Dec. 14, 2017

Related U.S. Application Data

(63) Continuation of application No. PCT/US2016/027530, filed on Apr. 14, 2016.

(60) Provisional application No. 62/180,271, filed on Jun. 16, 2015.

(51) Int. Cl.
| | | |
|---|---|---|
| *F15B 15/10* | (2006.01) | |
| *B64C 13/36* | (2006.01) | |
| *F15B 15/19* | (2006.01) | |
| *F42B 10/64* | (2006.01) | |

(52) U.S. Cl.
CPC ............ *F15B 15/103* (2013.01); *B64C 13/36* (2013.01); *F15B 15/19* (2013.01); *F15B 2211/715* (2013.01); *F15B 2211/853* (2013.01); *F15B 2211/8606* (2013.01); *F42B 10/64* (2013.01)

(58) Field of Classification Search
CPC .............................. F15B 15/103; F15B 15/19

USPC ............................................................. 92/92
See application file for complete search history.

(56) References Cited

U.S. PATENT DOCUMENTS

| 4,615,260 A | 10/1986 | Takagi et al. |
| 5,021,064 A | 6/1991 | Caines |
| 7,837,144 B2 * | 11/2010 | Kothera ................. B63B 1/248 92/92 |
| 2008/0035798 A1 | 2/2008 | Kothera et al. |

FOREIGN PATENT DOCUMENTS

DE 102004003421 A1 8/2005

OTHER PUBLICATIONS

"Shadow Air Muscles"; Shadow Robot Company; https://web.archive.org/web/20170507114536/http://www.shadowrobot.com/products/air-muscles/, accessed Oct. 20, 2014; 3 pages.

(Continued)

*Primary Examiner* — Michael Leslie

(57) ABSTRACT

A pneumatic artificial muscle (PAM) actuator includes first and second end caps, an elastic bladder connected to the end caps, and a covering around the elastic bladder and connected to the end caps. At least one of the first and second end caps is configured to move and narrow a distance between the end caps in response to inflation of the elastic bladder by a fluid. At least one of the end caps includes a vent configured to allow the fluid to exit the elastic bladder and collapse the covering after activation of the PAM actuator. At least the covering is configured to provide braking for the PAM actuator. The covering may be configured to collapse at least partially between the first and second end caps to provide at least some of the braking for the PAM actuator.

20 Claims, 7 Drawing Sheets

(56) References Cited

OTHER PUBLICATIONS

"Shadow 30mm Air Muscle—Specification"; Shadow Robot Company; http://www.shadowrobot.com/wp-content/uploads/2012/11/datasheet_30mm_sam.pdf; 2011; 11 pages.
"Pneumatic Artificial Muscles"; Techno-Sciences Inc.; https://web.archive.org/web/20121108182348/http://www.technosci.com/solutions-and-products/advanced-technology/pam, accessed on Nov. 8, 2012; 3 pages.
"Sam animation-real-muscle.gif"; https://commons.wikimedia.org/wiki/File:Sam_animation-real-muscle.gif; May 14, 2007; 6 pages.
Foreign Communication from Related Counterpart Application; PCT Application No. PCT/US2016/027530; International Search Report and Written Opinion of the International Searching Authority dated Dec. 2, 2016; 11 pages.
European Patent Office, "Communication pursuant to Article 94(3) EPC," Application No. EP16787950.1, Mar. 29, 2019, 6 pages.

\* cited by examiner

APPARATUS AND METHOD FOR HIGH ENERGY DENSITY LINEAR ACTUATION WITH INTEGRAL BRAKING

CROSS-REFERENCE TO RELATED APPLICATIONS AND PRIORITY CLAIM

This application claims priority as a continuation of PCT Patent Application No. PCT/US2016/027530 filed on Apr. 14, 2016, which claims priority to U.S. Provisional Patent Application No. 62/180,271 filed on Jun. 16, 2015. These applications are hereby incorporated by reference in their entirety.

TECHNICAL FIELD

This disclosure is generally directed to actuator systems. More specifically, this disclosure is directed to an apparatus and method for high energy density linear actuation with integral braking.

BACKGROUND

Various devices and systems use linear actuators to move objects rapidly. For example, linear actuators can be used to rapidly deploy wings or fins of drones, missiles, or other flight vehicles after launch. The deployment of wings or fins often needs to occur quickly so that a flight vehicle can assume a stable flight configuration in a timely manner after launch.

Once a linear actuator has been activated, movement of the linear actuator typically stops either due to contact with other structures or using a braking system. If a braking system is not used, a linear actuator can strike other structures with enough force to induce a shock load that breaks the actuator itself, the actuated structure, or adjacent structures. To avoid this, attempts have been made to balance the forces in a system so that braking is not required. However, this approach is problematic in that it may not be possible or desirable in some applications to balance the forces for a linear actuator in this manner Conventional braking systems often incorporate crush features or use viscous damping mechanisms. However, these approaches add complexity and weight to the overall system.

SUMMARY

This disclosure provides an apparatus and method for high energy density linear actuation with integral braking.

In a first embodiment, a method includes inflating an elastic bladder of a pneumatic artificial muscle (PAM) actuator to move an object connected to the PAM actuator. The PAM actuator includes a covering around the elastic bladder. The method also includes venting the elastic bladder while the object connected to the PAM actuator is moving and braking the PAM actuator using at least the covering.

In a second embodiment, an apparatus includes a PAM actuator having first and second end caps, an elastic bladder connected to the end caps, and a covering around the elastic bladder and connected to the end caps. At least one of the first and second end caps is configured to move and narrow a distance between the end caps in response to inflation of the elastic bladder by a fluid. At least one of the end caps includes a vent configured to allow the fluid to exit the elastic bladder and collapse the covering after activation of the PAM actuator, where at least the covering is configured to provide braking for the PAM actuator.

In a third embodiment, a flight vehicle includes at least one wing or fin and at least one PAM actuator configured to deploy the at least one wing or fin. Each PAM actuator includes first and second end caps, an elastic bladder connected to the end caps, and a covering around the elastic bladder and connected to the end caps. At least one of the first and second end caps is configured to move and narrow a distance between the end caps in response to inflation of the elastic bladder by a fluid. At least one of the end caps includes a vent configured to allow the fluid to exit the elastic bladder and collapse the covering after activation of the PAM actuator, where at least the covering is configured to provide braking for the PAM actuator.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1A through 10, discussed below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

Figure 1A:
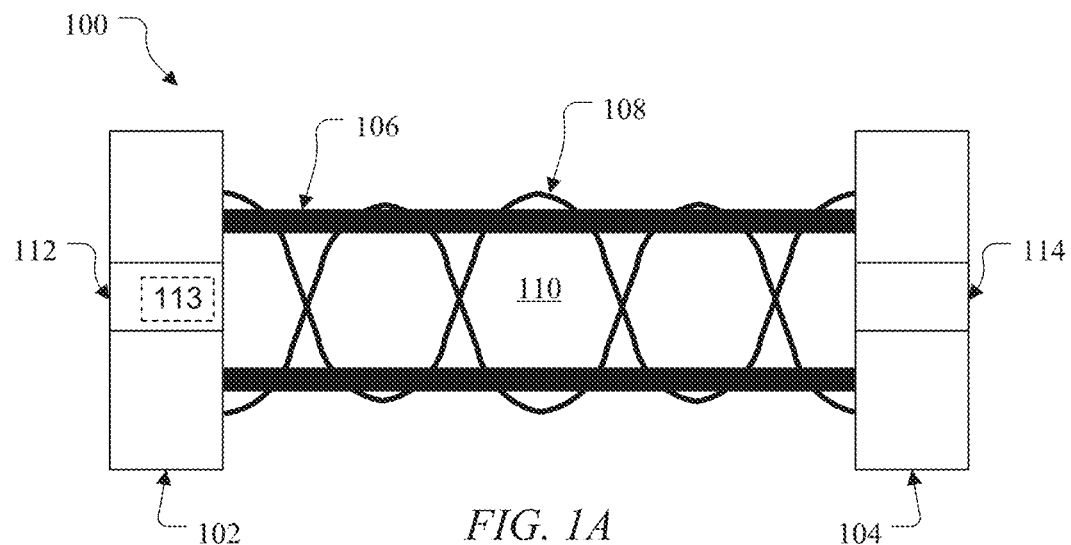
FIGS. 1A and 1B illustrate an example pneumatic artificial muscle (PAM) actuator in accordance with this disclosure.
Figure 1B:
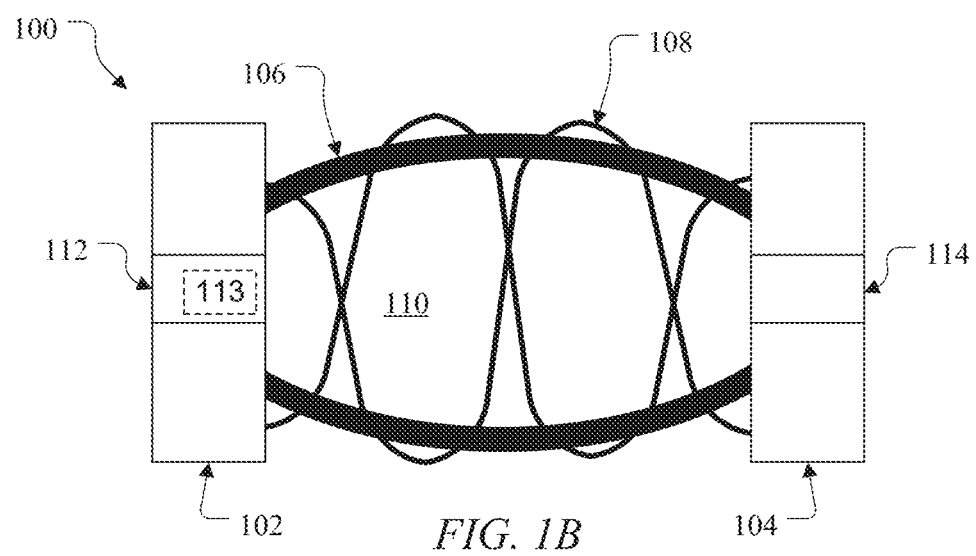

FIGS. 1A and 1B illustrate an example pneumatic artificial muscle (PAM) actuator 100 in accordance with this disclosure. In particular, FIG. 1A illustrates a cross-sectional view of a PAM actuator 100 prior to actuation, and FIG. 1B illustrates a cross-sectional view of the PAM actuator 100 during actuation.

As shown in FIGS. 1A and 1B, the PAM actuator 100 includes end caps 102-104, an elastic bladder 106, and a covering 108. The end caps 102-104 denote components that can be connected to other structures or devices. For example, the end cap 102 could be secured to a support structure, and the end cap 104 could be secured to a structure to be moved in some manner As a particular example, the end cap 102 could be secured to a frame or other portion of a flight vehicle, and the end cap 104 could be secured to a wing or fin of the flight vehicle to be deployed upon launch of the flight vehicle. Each end cap 102-104 could be formed from any suitable material(s), such as metal or ruggedized plastic. Each end cap 102-104 could also be formed in any suitable manner, such as machining or molding. Each end cap 102-104 could further have any suitable size, shape, and dimensions.

The elastic bladder 106 is sealed to the end caps 102-104 and forms an internal cavity 110. The internal cavity 110 receives a fluid (such as one or more gasses) to increase a pressure within the elastic bladder 106, which inflates the elastic bladder 106 and moves the end caps 102-104 closer together. If the end cap 102 is secured to a support structure so that the end cap 102 does not move or moves to a small extent, inflating the elastic bladder 106 effectively pulls the end cap 104 towards the end cap 102. The elastic bladder 106 can be formed from any suitable material(s), such as rubber, elastomer, or other compliant material(s). The elastic bladder 106 can also be formed in any suitable manner.

The covering 108 covers the elastic bladder 106 and is mechanically connected to the end caps 102-104. The covering 108 is generally formed from fibers or other components that are less elastic than the elastic bladder 106. The covering 108 can be formed from any suitable material(s) and in any suitable manner For example, the covering 108 could be formed using cross-woven helical windings that are closely spaced but loosely wound around the elastic bladder 106. While the covering 108 is shown here as having two cross-woven helical windings, this is only for convenience so that components within the covering 108 can be viewed.

During actuation of the PAM actuator 100, fluid is received into the internal cavity 110 of the elastic bladder 106 via a high-pressure inlet/source 112. In some embodiments, the inlet/source 112 represents a passageway through which high-pressure fluid provided by an external source can enter the elastic bladder 106. In other embodiments, the inlet/source 112 represents or includes a source 113 of high-pressure gas or other fluid that can be activated to provide the fluid into the elastic bladder 106. In the latter embodiments, any source(s) 113 of fluid could be placed on an outer surface of the end cap 102, an inner surface of the end cap 102, or internally within the end cap 102. If the source of fluid is a propellant (such as a gas generator), the propellant could even be within the cavity 110

As shown in FIGS. 1A and 1B, when pressure is introduced into the cavity 110 via the inlet/source 112, this causes the elastic bladder 106 to expand. The covering 108 cannot expand or cannot expand as much as the elastic bladder 106, so the covering 108 instead retracts axially in order to provide extra circumferential length around the elastic bladder 106. This axial retraction brings the end caps 102-104 closer together, providing actuation force and motion.

In accordance with this disclosure, the PAM actuator 110 includes at least one vent 114, such as in one or more of the end caps 102-104. In the examples illustrated in this patent document, a single vent 114 is shown as residing in the end cap 104, although the number of vents and the positioning of the vent(s) are for illustration only. The vent 114 can be mechanically operated to allow fluid within the internal cavity 110 to escape the elastic bladder 106. As described below, the vent 114 can allow fluid within the internal cavity 110 to escape the elastic bladder 106 during actuation of the PAM actuator 100 in order to allow the covering 108 (and possibly the elastic bladder 106) to act as a braking mechanism for the PAM actuator 100. Each vent 114 includes any suitable structure allowing passage of fluid. Various example implementations of the vent 114 are provided below, although any additional type(s) of vent(s) could be used in a PAM actuator.

Figure 2A:
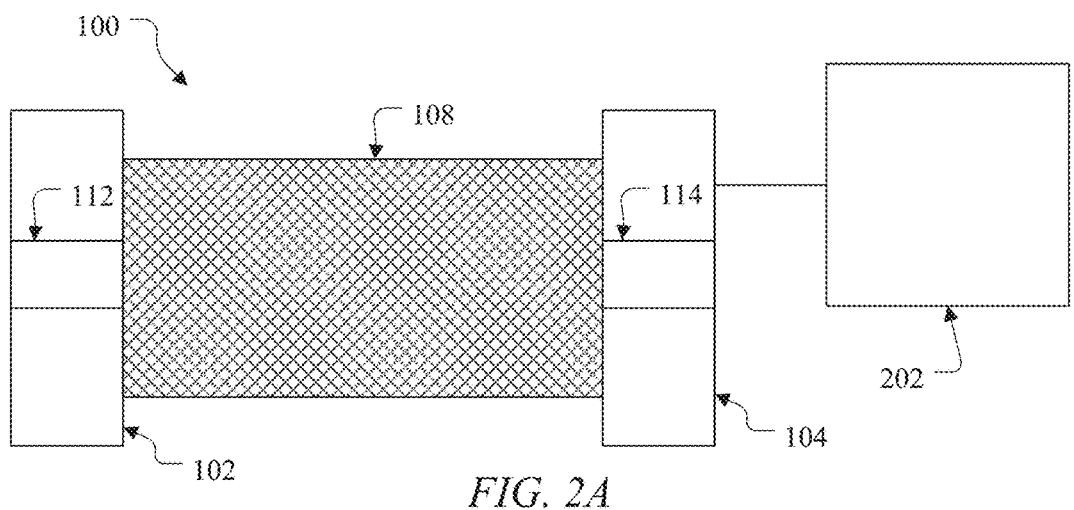
FIGS. 2A through 2E illustrate example operation of a PAM actuator in accordance with this disclosure.

FIGS. 2A through 2E illustrate example operation of the PAM actuator 100 in accordance with this disclosure. As shown in FIG. 2A, the PAM actuator 100 is in a pre-actuation state, where the end caps 102-104 are at their maximum separation. The covering 108 and the elastic bladder 106 are stretched here between the end caps 102-104. In this example, at least one object 202 is attached to the end cap 104. The PAM actuator 100 in this example operates to move the object(s) 202 in some manner via linear actuation. This could include imparting linear movement to the object 202 or, if the object 202 is mounted on a pivot point, imparting rotational movement to the object 202.

Figure 2B:
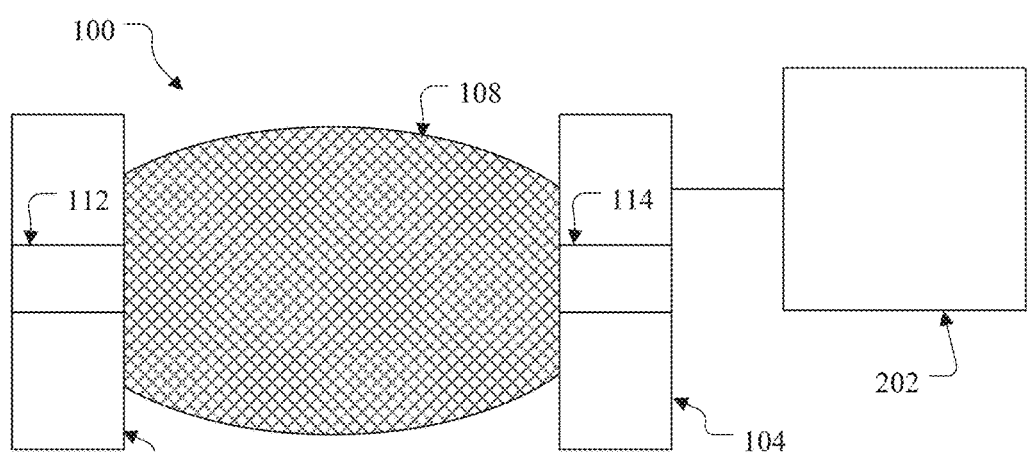

As shown in FIG. 2B, the PAM actuator 100 has been triggered, and high-pressure gas or other fluid is entering the internal cavity 110 from or through the inlet/source 112. Also, the vent 114 remains closed, so the high-pressure gas or other fluid imparts rapid inflation of the elastic bladder 106. This begins the process of rapidly pulling the end caps 102-104 closer together.

Figure 2C:
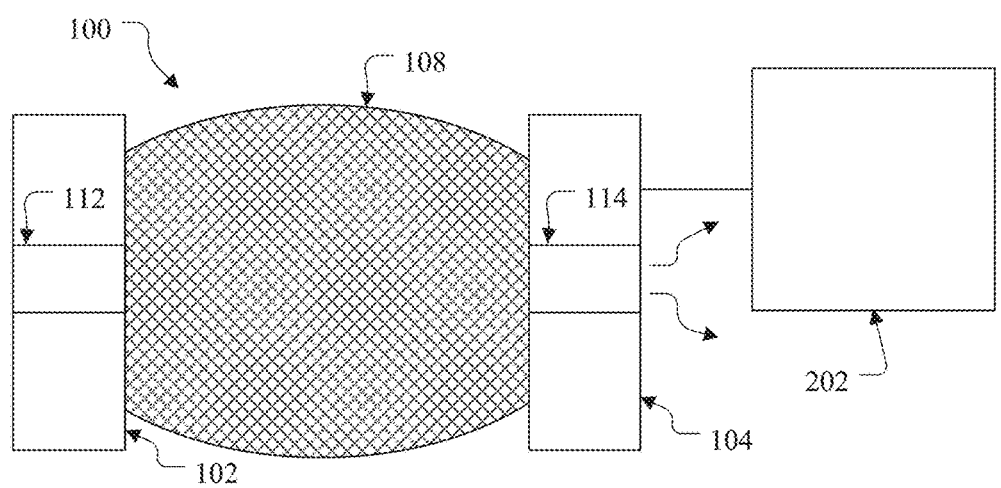

As shown in FIG. 2C, more fluid has entered the internal cavity 110 from or through the inlet/source 112, inflating the elastic bladder 106 to a larger extent. Since this is done rapidly, it can (for example) impart momentum to the end cap 104 or to the object 202 attached to the end cap 104. At some point, the vent 114 opens, allowing the fluid in the internal cavity 110 to begin escaping from the elastic bladder 106. This starts to lower the pressure within the internal cavity 110.

Figure 2D:
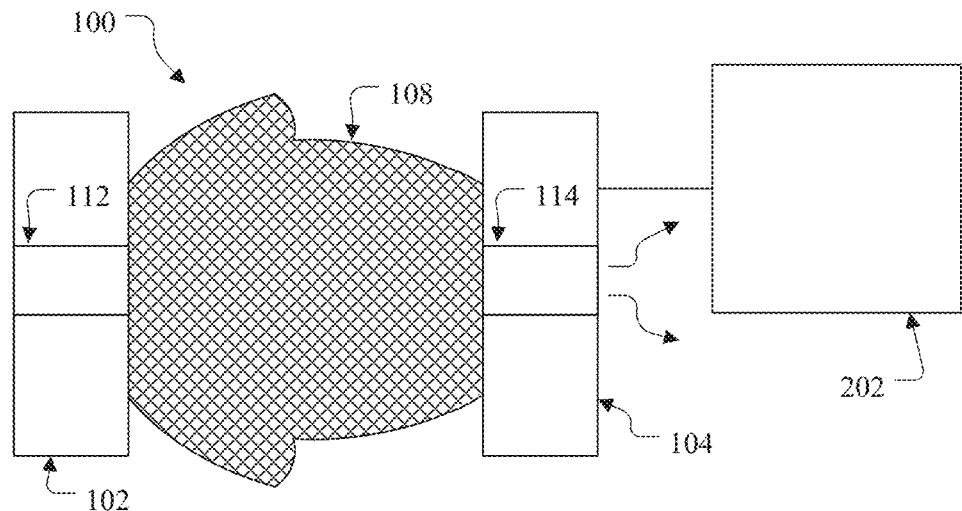
Figure 2E:
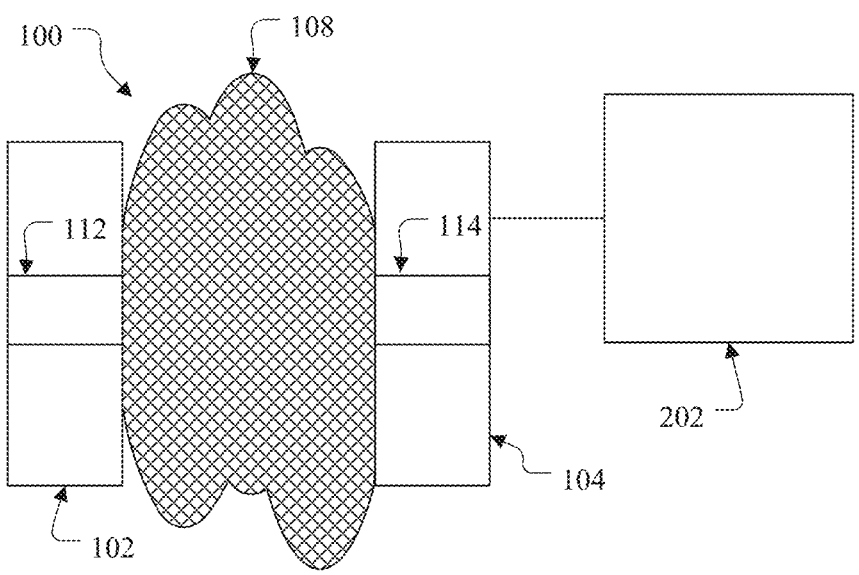

As shown in FIG. 2D, the inward movement of the end cap 104 and the object 202 continues due to the momentum, while fluid continues to escape via the vent 114. Because of this, the covering 108 begins to collapse on itself. Finally, as shown in FIG. 2E, the collapsed covering 108 and bladder 106 provide damping and shock isolation as the end cap 104 completes its travel and comes to a stop. There is no striking of the end cap 104 against the end cap 102 or other structure, although there could also be a strike between the end caps 102-104 at a lower velocity than they would have struck without the shock isolation of the covering 108 and the bladder 106.

As can be seen here, the PAM actuator 100 incorporates a venting mechanism that allows the internal cavity 110 of the PAM actuator 100 to vent during operation of the actuator 100. The venting deflates a portion of the PAM actuator 100 and allows the PAM actuator 100 to function as its own braking mechanism. In this way, braking can be provided with a PAM actuator 100, helping to reduce or prevent damage to the actuator 100 itself, an actuated object 202, or adjacent structures due to shock. Moreover, this approach helps to reduce or prevent the need for bulky braking systems such as crush features or viscous damping mechanisms, which can help to reduce the size, weight, and cost of the PAM actuator 100.

This approach can therefore provide a low weight and low cost approach to braking a linear actuator. Moreover, this approach can provide inherent end-of-stroke shock isolation. In addition, as with many PAM actuators, this approach can provide misalignment tolerance between the end caps 102-104, meaning the end caps 102-104 need not be precisely centered on a central axis of the PAM actuator 100, which can further reduce costs compared to other systems.

Although FIGS. 1A and 1B illustrate one example of a PAM actuator 100 and FIGS. 2A through 2E illustrate example operation of the PAM actuator 100, various changes may be made to FIGS. 1A through 2E. For example, each component could have any suitable size, shape, and dimensions, and the relative sizes of the components are for illustration only. Also, the shapes of the covering 108 before, during, and after inflation are examples only.

FIGS. 3A through 8 illustrate example venting mechanisms for use in a PAM actuator in accordance with this disclosure. In particular, FIGS. 3A through 8 illustrate example techniques for implementing the vent(s) 114 in the PAM actuator 100. Note that depending on the implementation, a vent 114 in one end cap may operate by itself or in conjunction with other components, including components in or on the other end cap.

Figure 3A:
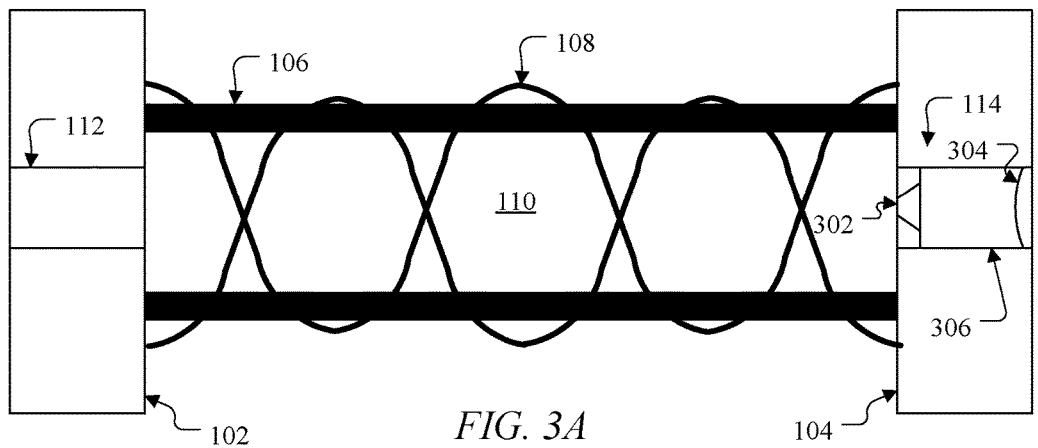
FIGS. 3A through 8 illustrate example venting mechanisms for use in a PAM actuator in accordance with this disclosure.

As shown in FIG. 3A, in some embodiments, a vent 114 can be implemented using an orifice 302 and a burst disc 304 located within a passageway 306 through the end cap 104. The burst disc 304 denotes a structure that bursts, fractures, or otherwise breaks when a sufficiently-high pressure is applied against the burst disc 304. The orifice 302 slows the passage of fluid towards the burst disc 304, thereby controlling how quickly the burst disc 304 bursts upon introduction of the high-pressure fluid into the internal cavity 110.

Figure 3B:
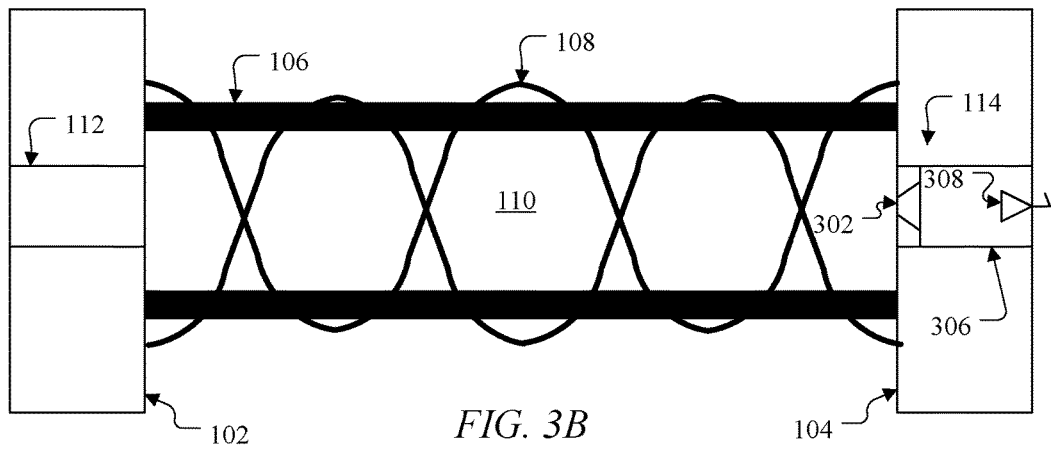

The orifice 302 includes any suitable structure defining an opening through which fluid can flow. The burst disc 304 includes any suitable structure that breaks to allow venting of a PAM actuator at a desired pressure. The timing of the venting by the vent 114 can be controlled using various design parameters, such as the size of the orifice 302, the strength of the burst disc 304 (which can be based on the material or design of the burst disc 304), and the volume of space between the orifice 302 and the burst disc 304. Note that the burst disc 304 shown in FIG. 3A can be replaced by a pressure relief valve 308 that opens to relieve pressure within the cavity 110 as shown in FIG. 3B.

Figure 4:
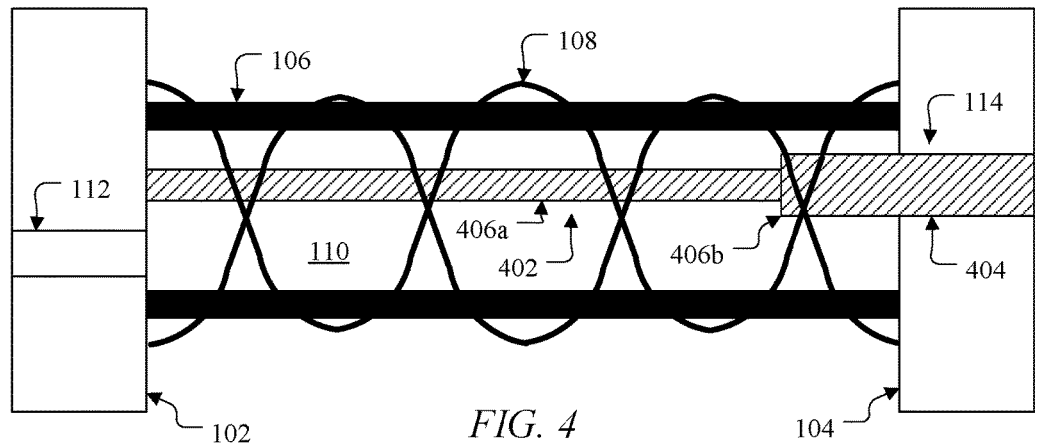

As shown in FIG. 4, in some embodiments, a vent 114 can be implemented using a valve. In this example, a valve rod 402 extends between the end caps 102-104 and through a passageway 404 of the end cap 104. The valve rod 402 includes a thinner section 406a with a smaller diameter and a thicker section 406b with a larger diameter. The thicker section 406b initially fits within the passageway 404 of the end cap 104 prior to actuation. Once actuated, the end cap 104 approaches the end cap 102, and the thicker section 406b begins to exit the passageway 404. Eventually, the thinner section 406a enters and starts exiting the passageway 404, allowing fluid within the internal cavity 110 to escape through the passageway 404 around the thinner section 406a of the valve rod 402.

The valve rod 402 includes any suitable structure having a variable diameter that operates to allow escape of fluid through a passageway. Note that the valve rod 402 here could optionally be configured to provide some guiding action to thereby control how the end cap(s) 102 or 104 moves during actuation. Also note that while the valve rod 402 here has an immediate transition between sections 406a-406b, the valve rod 402 could be contoured to provide metered venting. The timing of the venting by the vent 114 can be controlled using various design parameters, such as the length of the thicker section 406b and the length of the passageway 404.

Figure 5:
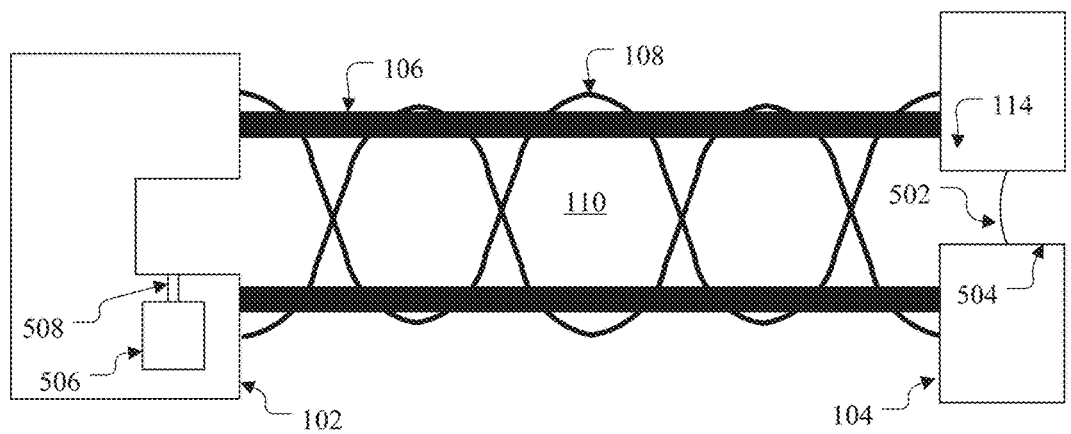

As shown in FIG. 5, in some embodiments, a vent 114 can be implemented using a burst disc. As shown here, a burst disc 502 resides within a passageway 504 through the end cap 104, and a gas source 506 is positioned on or in the end cap 102. The gas source 506 provides gas into the internal cavity 110 through at least one passageway 508, which increases a pressure within the internal cavity 110. This activates the PAM actuator 100 and causes the end caps 102-104 to move closer together. Eventually, the pressure within the internal cavity 110 reaches a suitable value and causes the burst disc 504 to burst, fracture, or otherwise break, venting the internal cavity 110.

The burst disc 502 includes any suitable structure that breaks to allow venting of a PAM actuator at a desired pressure. The timing of the venting by the vent 114 can be controlled using various design parameters, such as the strength of the burst disc 502 and the amount of gas released by the gas source 506. The gas source 506 includes any suitable source(s) of gas, such as a pyrotechnic gas source.

Figure 6:
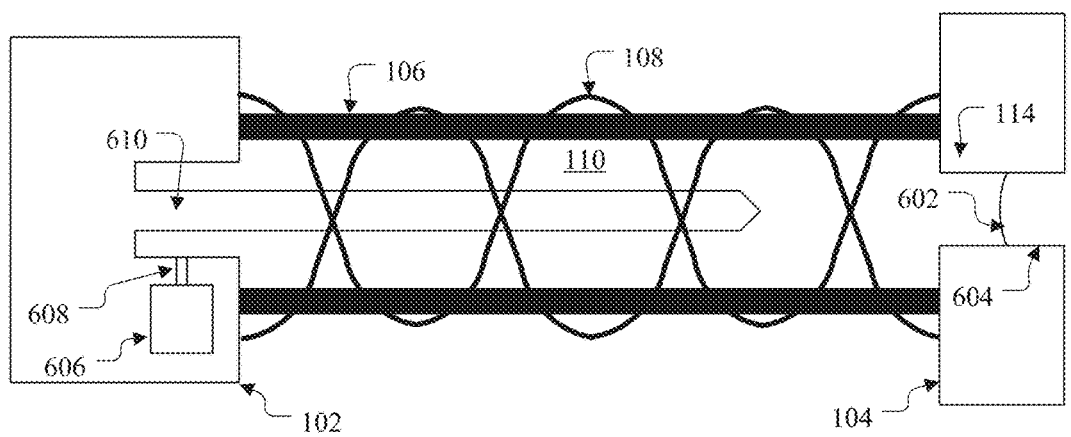

FIG. 6 shows a similar embodiment as FIG. 5. In FIG. 6, a burst disc 602 resides within a passageway 604 through the end cap 104, and a gas source 606 is positioned on or in the end cap 102. The gas source 606 provides gas into the internal cavity 110 through at least one passageway 608, which increases a pressure within the internal cavity 110. This activates the PAM actuator 100 and causes the end caps 102-104 to move closer together. The end cap 102 also includes at least one spike or other projection 610 that extends from the end cap 102 towards the burst disc 602. The projection 610 is used to help break the burst disc 602 once the end caps 102-104 move to within a desired distance of one another. This may be beneficial since burst discs can have some tolerance in the pressures at which they burst, and the PAM actuator in FIG. 6 uses the projection 610 to help ensure that the burst disc 602 breaks at a desired position of the end cap(s) 102-104.

The burst disc 602 includes any suitable structure that breaks to allow venting of a PAM actuator at a desired pressure. The timing of the venting by the vent 114 can be controlled using various design parameters, such as the strength of the burst disc 602, the amount of gas released by the gas source 606, and the length of the projection 610. The gas source 606 includes any suitable source(s) of gas, such as a pyrotechnic gas source. The projection 610 includes any suitable structure configured to contact and help break a burst disc.

Figure 7:
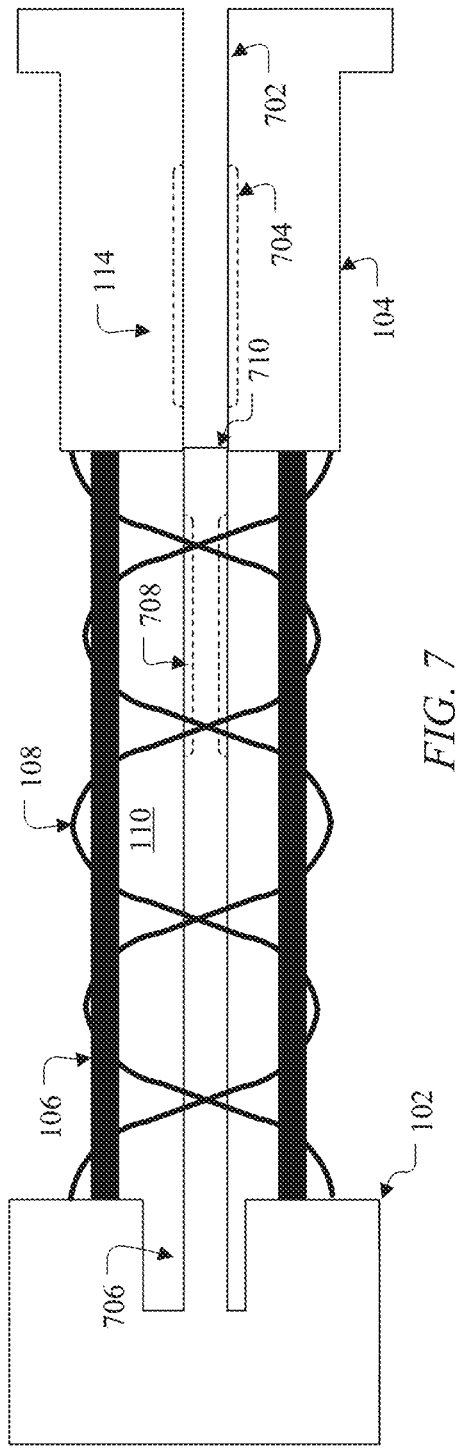

As shown in FIG. 7, in some embodiments, a vent 114 can be implemented using connecting channels in the end caps. As shown here, the end cap 104 includes a passageway 702 and one or more channels 704 that are adjacent to the passageway 702. Also, the end cap 102 includes at least one projection 706, and the projection 706 includes at least one channel 708. The channels 704 and 708 denote areas through which fluid can travel to escape the internal cavity 110 of the PAM actuator.

During operation, the projection 706 of the end cap 102 travels through the passageway 702 of the end cap 104. Initially, only the tip 710 of the projection 706 is located within the passageway 702. However, as the projection 706 enters further into the passageway 702, the channels 704 and 708 eventually meet and provide a pathway for fluid to escape around the tip 710 of the projection 706. This allows fluid to escape the internal cavity 110 of the PAM actuator. Optionally, the tip 710 of the projection 706 may eventually pass the channels 704 and once again substantially prevent fluid from escaping through the channels 704 and 708. At this point, the fluid remaining within the cavity 110 could provide some form of cushioning in addition to the cushioning provided by the elastic bladder 106 and the covering 108.

Figure 8:
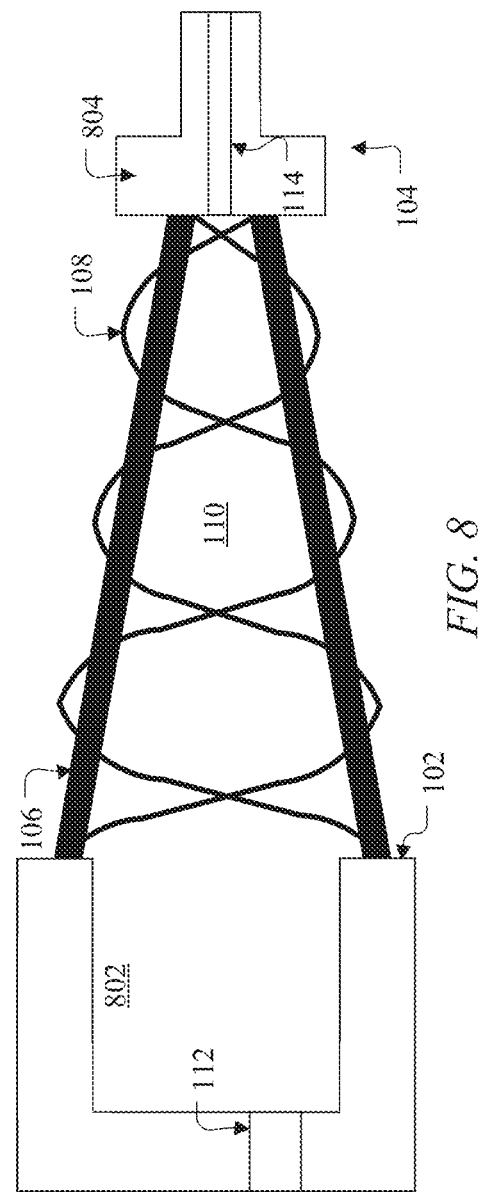

As shown in FIG. 8, in some embodiments, the geometry of the end caps 102-104 can be tailored to control how the elastic bladder 106 and the covering 108 collapse and provide cushioning for the PAM actuator. In this example, the end cap 102 includes a bore or other opening 802 that is configured to receive at least part of the end cap 104. Also, the end cap 104 includes a head 804 that fits within the opening 802. During operation of the PAM actuator, at least part of the end cap 104 can enter into the bore 802 of the end cap 102, which effectively turns inside out or inverts at least a portion of the elastic bladder 106 and the covering 108. As a result, instead of merely collapsing on itself, the elastic bladder 106 and the covering 108 collapse and are then partially re-extended in an inverted manner Braking can be provided here in various ways, such as when the fibers forming the covering 108 rub together when the covering 108 is being inverted to slow movement of the end cap(s) 102-104. Each of the end caps 102-104 could have any suitable size, shape, and dimensions in FIG. 8.

Note that in FIG. 8, a vent 114 is shown in the end cap 104 extending through the longer portion of the end cap 104. However, one or more vents could also or alternatively extend through shorter portion(s) of the end cap 104. Any of the specific venting mechanisms described above could be used in FIG. 8. Also note that FIG. 8 denotes one example way in which the elastic bladder 106 and the covering 108 could be collapsed and partially re-extended. Other designs of the end caps 102-104 could support other re-extensions of the elastic bladder 106 and the covering 108.

Although FIGS. 3A through 8 illustrate various examples of venting mechanisms for use in a PAM actuator 100, various changes may be made to FIGS. 3A through 8. For example, each component could have any suitable size, shape, and dimensions, and the relative sizes of the components are for illustration only. Also, any other suitable mechanism could be used to provide selective venting for a PAM actuator 100. Further, certain components can be replaced by other components that perform the same or similar function(s). In addition, note that features of various figures could be combined, such as when a component in one or more of these figures is incorporated into others of these figures.

Figure 9:
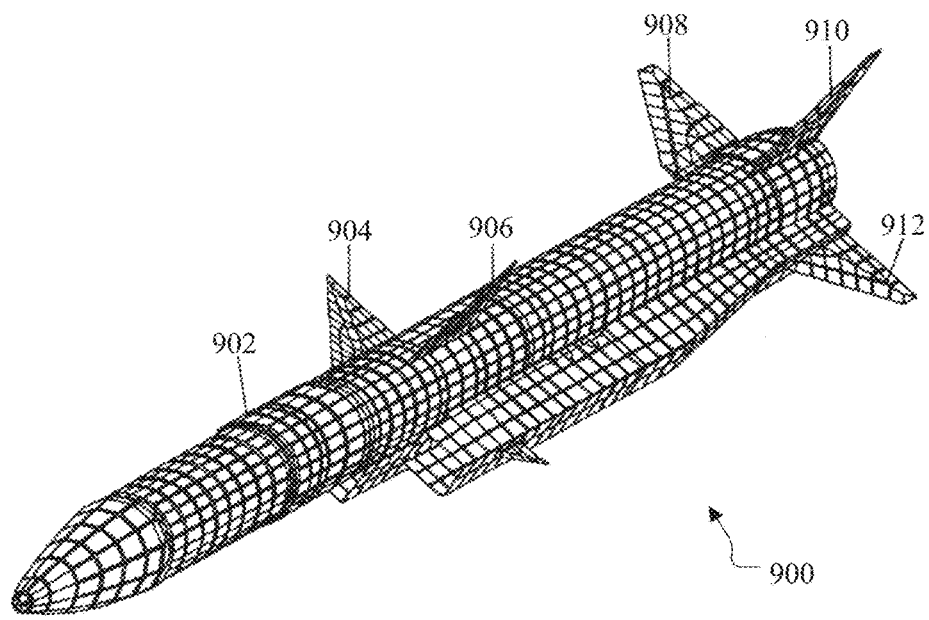
FIG. 9 illustrates an example system using one or more PAM actuators with venting mechanisms in accordance with this disclosure.

FIG. 9 illustrates an example system 900 using one or more PAM actuators with venting mechanisms in accordance with this disclosure. In this particular example, the system 900 includes a missile 902 having multiple wings or fins 904-910. At least some of these wings or fins 904-910 could be retracted prior to launch and, upon launch, extended using one or more PAM actuators 100.

Note that the use of PAM actuators 100 on missiles represents one specific example usage of the PAM actuators. The PAM actuators 100 could be used on other types of flight vehicles, such as drones. Moreover, the PAM actuators 100 could be used with any other suitable devices or systems where rapid linear actuation followed by braking is needed or desired, regardless of whether the devices or systems are flight vehicles.

Figure 10:
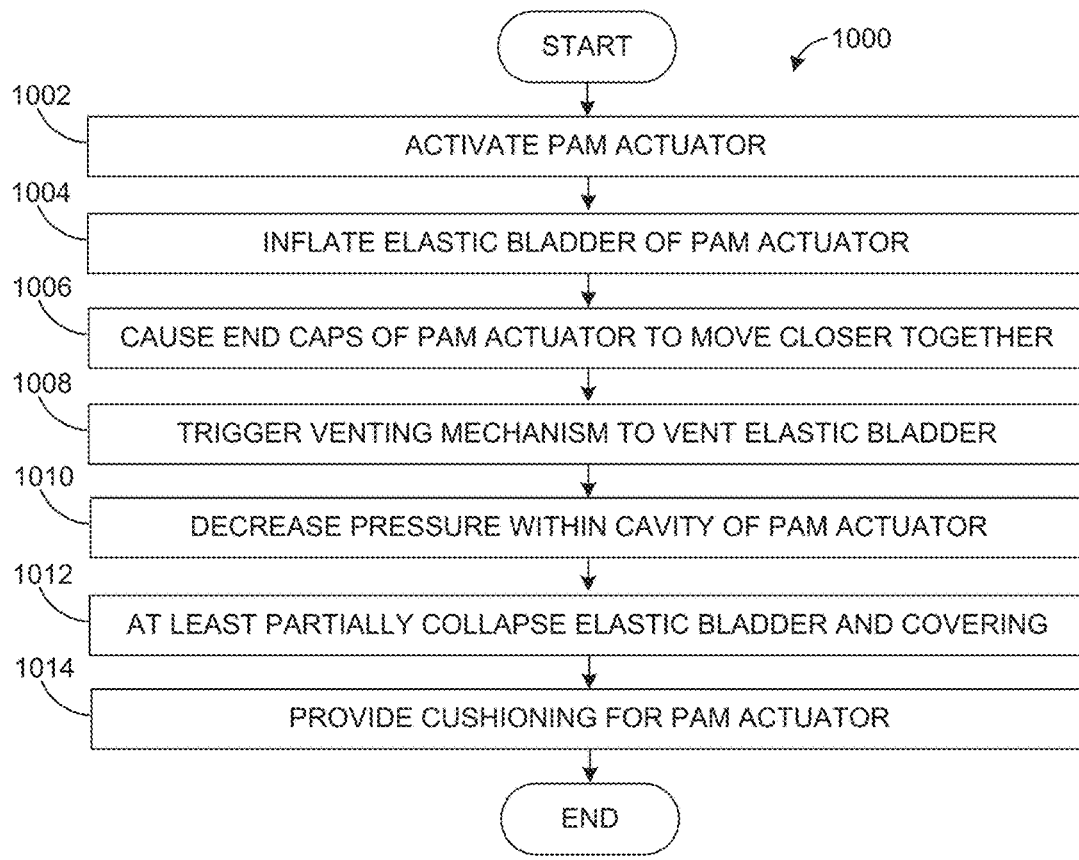
FIG. 10 illustrates an example method for operating a PAM actuator and providing integral braking in accordance with this disclosure.

FIG. 10 illustrates an example method 1000 for operating a PAM actuator and providing integral braking in accordance with this disclosure. For ease of explanation, the method 1000 is described with respect to the PAM actuator 100 containing one or more of the venting mechanisms shown in FIGS. 3A through 8. Note, however, that the method 1000 could be used by any suitable PAM actuator and with any suitable venting mechanism(s).

As shown in FIG. 10, a PAM actuator is activated at step 1002. This could include, for example, providing high-pressure gas or other fluid from or through the inlet/source 112 into the internal cavity 110 of the PAM actuator 100. As a particular example, this could include activating a source 113 of high-pressure fluid, such as a gas source 506 or 606, to introduce the high-pressure fluid into the internal cavity 110 of the PAM actuator 100.

An elastic bladder of the PAM actuator inflates at step 1004, which causes end caps of the PAM actuator to move closer together at step 1006. This could include, for example, the high-pressure fluid entering the internal cavity 110 of the PAM actuator 100 to expand the elastic bladder 106. Since the covering 108 cannot expand or cannot expand as much as the elastic bladder 106, the covering 108 retracts axially and causes the end caps 102-104 of the PAM actuator 100 to move closer together. As noted above, one end cap (such as the end cap 102) could be fixed in place, so the axial retraction of the covering 108 causes only one of the end caps (such as the end cap 104) to physically move. However, other approaches in which both end caps 102-104 move could also be used.

At least one venting mechanism of the PAM actuator is triggered at step 1008, causing a decrease in pressure within the internal cavity of the PAM at step 1010. This could include, for example, a burst disc of the venting mechanism breaking (with or without assistance), a larger portion of a valve rod exiting a passageway through an end cap, or channels of the end caps joining to provide an avenue for fluid to escape. However the venting mechanism operates, the venting mechanism allows fluid within the internal cavity 110 of the PAM actuator 100 to escape the internal cavity 110, lowering the pressure within the internal cavity 110.

Because of the decreased pressure within the internal cavity, the elastic bladder and a covering of the PAM actuator at least partially collapse at step 1012. This could include, for example, the elastic bladder 106 and the covering 108 of the PAM actuator 100 collapsing between the end caps 102-104. As noted above, this could optionally also include at least partially re-extending the elastic bladder 106 and the covering 108 of the PAM actuator 100, such as in an inverted manner. Cushioning for the PAM actuator is provided at step 1014. This could include, for example, the collapsed bladder 106 and covering 108 providing the cushioning by slowing the movement of the end caps 102-104 toward one another.

In this manner, the PAM actuator 100 incorporates a braking mechanism using its own components to help stop movement of the end cap(s) 102-104 during operation of the PAM actuator 100. There is no need to incorporate additional external or internal components to stop the movement of the end cap(s) 102-104 during operation of the PAM actuator 100, which can help to simplify the design and reduce the size, weight, and cost of the actuator. Moreover, some designs of the PAM actuator 100 can tolerate misalignment of the end caps 102-104 to a larger extent than conventional designs.

Although FIG. 10 illustrates one example of a method 1000 for operating a PAM actuator and providing integral braking, various changes may be made to FIG. 10. For example, while shown as a series of steps, various steps in FIG. 10 could overlap or occur in parallel. Also, if the PAM actuator is designed for use multiple times (such as after manual or automated extension of the PAM actuator after use), the steps shown in FIG. 10 could occur any number of times.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
    during a single actuation of a pneumatic artificial muscle (PAM) actuator in which a distance between first and second end caps of the PAM actuator narrows:
        inflating an elastic bladder of the PAM actuator to move an object connected to the PAM actuator, the PAM actuator comprising a covering around the elastic bladder;
        venting the elastic bladder while the object connected to the PAM actuator is moving; and
        braking the PAM actuator using at least the covering.

2. The method of claim 1, wherein braking the PAM actuator using at least the covering comprises collapsing the covering at least partially between the first and second end caps.

3. The method of claim 2, wherein braking the PAM actuator further comprises:
    re-extending a portion of the covering.

4. The method of claim 1, wherein venting the elastic bladder comprises using a burst disc or a pressure relief valve to allow fluid to escape from the elastic bladder.

5. A method comprising:
    inflating an elastic bladder of a pneumatic artificial muscle (PAM) actuator to move an object connected to the PAM actuator, the PAM actuator comprising a covering around the elastic bladder;
    venting the elastic bladder while the object connected to the PAM actuator is moving; and
    braking the PAM actuator using at least the covering;
    wherein:
        venting the elastic bladder comprises breaking a burst disc to allow fluid to escape from the elastic bladder;
        the PAM actuator comprises first and second end caps;
        the burst disc is located in the second end cap; and
        breaking the burst disc comprises breaking the burst disc using a projection extending from the first end cap towards the burst disc.

6. A method comprising:
    inflating an elastic bladder of a pneumatic artificial muscle (PAM) actuator to move an object connected to the PAM actuator, the PAM actuator comprising a covering around the elastic bladder;
    venting the elastic bladder while the object connected to the PAM actuator is moving; and
    braking the PAM actuator using at least the covering;
    wherein:
        venting the elastic bladder comprises using a burst disc to allow fluid to escape from the elastic bladder; and
        the method further comprises slowing passage of the fluid towards the burst disc using an orifice placed between the burst disc and an internal cavity of the PAM actuator.

7. A method comprising:
    inflating an elastic bladder of a pneumatic artificial muscle (PAM) actuator to move an object connected to the PAM actuator, the PAM actuator comprising a covering around the elastic bladder;
    venting the elastic bladder while the object connected to the PAM actuator is moving; and
    braking the PAM actuator using at least the covering;
    wherein:
        the PAM actuator comprises first and second end caps;
        the first end cap comprises a valve rod, the valve rod having a thinner section with a smaller diameter and a thicker section with a larger diameter, the thicker section configured to extend into a passageway of the second end cap; and
        venting the elastic bladder comprises moving at least one of the end caps so that the thicker section of the valve rod exits the passageway of the second end cap.

8. A method comprising:
    inflating an elastic bladder of a pneumatic artificial muscle (PAM) actuator to move an object connected to the PAM actuator, the PAM actuator comprising a covering around the elastic bladder;
    venting the elastic bladder pile the object connected to the PAM actuator is moving; and
    braking the PAM actuator using at least the covering;
    wherein:
        the PAM actuator comprises first and second end caps;
        the first end cap comprises a projection having at least one first channel;
        the second end cap comprises a passageway having at least one second channel, the passageway configured to receive the projection; and
        venting the elastic bladder comprises moving at least one of the end caps so that the first and second channels meet and provide a pathway that allows fluid to escape from the elastic bladder around a tip of the projection.

9. An apparatus comprising:
    a pneumatic artificial muscle(PAM) actuator comprising first and second end caps, an elastic bladder connected to the end caps, and a covering around the elastic bladder and connected to the end caps, at least one of the first and second end caps configured to move and narrow a distance between the end caps in response to inflation of the elastic bladder by a fluid;
    at least one of the end caps comprising a vent configured to allow the fluid to exit the elastic bladder and collapse the covering after activation of the PAM actuator while the distance between the end caps is narrowing, at least the covering configured to provide braking for the PAM actuator.

10. The apparatus of claim 9, wherein the covering is configured to collapse at least partially between the first and second end caps to provide at least some of the braking for the PAM actuator.

11. The apparatus of claim 10, wherein the end caps are configured to re-extend a portion of the covering.

12. The apparatus of claim 9, wherein the vent comprises a burst disc or a pressure relief valve configured to allow the fluid to escape from the elastic bladder.

13. An apparatus comprising:
a pneumatic artificial muscle (PAM) actuator comprising first and second end caps, an elastic bladder connected to the end caps, and a covering around the elastic bladder and connected to the end caps, at least one of the first and second end caps configured to move and narrow a distance between the end caps in response to inflation of the elastic bladder by a fluid;
at least one of the end caps corn rising a vent configured to allow the fluid to exit the elastic bladder and collapse the covering after activation of the PAM actuator, at least the covering configured to provide braking for the PAM actuator;
wherein:
the vent comprises a burst disc configured to allow the fluid to escape from the elastic bladder;
the burst disc is located in the second end cap; and
the first end cap comprises a projection extending from the first end cap towards the burst disc.

14. An apparatus comprising:
a pneumatic artificial muscle (PAM) actuator comprising first and second end caps, an elastic bladder connected to the end caps, and a covering around the elastic bladder and connected to the end caps at least one of the first and second end caps configured to move and narrow a distance between the end caps in response to inflation of the elastic bladder by a fluid;
at least one of the end caps comprising a vent configured to allow the fluid to exit the elastic bladder and collapse the covering after activation of the PAM actuator, at least the covering configured to provide braking for the PAM actuator;
wherein:
the vent comprises a burst disc configured to allow the fluid to escape from the elastic bladder; and
the vent further comprises an orifice between the burst disc and an internal cavity of the PAM actuator, the orifice configured to slow passage of the fluid towards the burst disc.

15. An apparatus comprising:
a pneumatic artificial muscle (PAM) actuator comprising first and second end caps, an elastic bladder connected to the end caps, and a covering around the elastic bladder and connected to the end caps at least one of the first and second end caps configured to move and narrow a distance between the end caps in response to inflation of the elastic bladder by a fluid;
at least one of the end caps comprising a vent configured to allow the fluid to exit the elastic bladder and collapse the covering after activation of the PAM actuator, at least the covering configured to provide braking for the PAM actuator;
wherein:
the first end cap comprises a valve rod, the valve rod having a thinner section with a smaller diameter and a thicker section with a larger diameter, the thicker section configured to extend into a passageway of the second end cap; and
the thicker section of the valve rod is configured to exit the passageway of the second end cap in response to movement of at least one of the end caps.

16. An apparatus comprising:
a pneumatic artificial muscle (PAM) actuator comprising first and second end caps, an elastic bladder connected to the end caps, and a covering around the elastic bladder and connected to the end caps, at least one of the first and second end caps configured to move and narrow a distance between the end caps in response to inflation of the elastic bladder by a fluid;
at least one of the end caps comprising a vent configured to allow the fluid to exit the elastic bladder and collapse the covering after activation of the PAM actuator, at least the covering configured to provide braking for the PAM actuator;
wherein:
the first end cap comprises a projection having at least one first channel;
the second end cap comprises a passageway having at least one second channel, the passageway configured to receive the projection; and
the first and second channels are configured to meet and provide a pathway that allows the fluid to escape from the elastic bladder around a tip of the projection in response to movement of at least one of the end caps.

17. A flight vehicle comprising:
at least one wing or fin; and
at least one pneumatic artificial muscle (PAM) actuator configured to deploy the at least one wing or fin;
wherein each PAM actuator comprises first and second end caps, an elastic bladder connected to the end caps, and a covering around the elastic bladder and connected to the end caps, at least one of the first and second end caps configured to move and narrow a distance between the end caps in response to inflation of the elastic bladder by a fluid; and
wherein, in each PAM actuator, at least one of the end caps comprises a vent configured to allow the fluid to exit the elastic bladder and collapse the covering after activation of the PAM actuator while the distance between the end caps is narrowing, at least the covering configured to provide braking for the PAM actuator.

18. The flight vehicle of claim 17, wherein, in each PAM actuator, the covering is configured to collapse at least partially between the first and second end caps to provide at least some of the braking for the PAM actuator.

19. The flight vehicle of claim 18, wherein, in each PAM actuator, the end caps are configured to re-extend a portion of the covering.

20. The flight vehicle of claim 17, wherein the vehicle comprises a missile.

* * * * *